(12) United States Patent
Baum et al.

(10) Patent No.: US 7,212,936 B2
(45) Date of Patent: May 1, 2007

(54) METHOD, SYSTEM AND COMPUTER PROGRAM PRODUCT FOR AUTOMATED DISCOVERY AND PRESENTATION OF THE DIRECTION OF FLOW THROUGH COMPONENTS REPRESENTED IN A DRAWING SET

(75) Inventors: Lawrence S. Baum, Bellevue, WA (US); John H. Boose, Bellevue, WA (US); Carey S. Chaplin, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/755,027

(22) Filed: Jan. 9, 2004

(65) Prior Publication Data

US 2005/0154558 A1   Jul. 14, 2005

(51) Int. Cl.
*G06F 19/00* (2006.01)
(52) U.S. Cl. .......................................... 702/92; 382/181
(58) Field of Classification Search .................. 702/36, 702/45, 68, 117, 118, 119, 123, 189, 92; 715/744, 715/764, 765, 771; 700/83, 86; 382/181
See application file for complete search history.

(56) References Cited

U.S. PATENT DOCUMENTS

| | | | | |
|---|---|---|---|---|
| 5,530,643 A | * | 6/1996 | Hodorowski | .................. 700/86 |
| 5,742,504 A | * | 4/1998 | Meyer et al. | .................. 700/83 |
| 5,867,596 A | * | 2/1999 | Kano et al. | .................. 382/203 |
| 6,606,731 B1 | | 8/2003 | Baum et al. | |
| 6,766,331 B2 | * | 7/2004 | Shema et al. | ................ 707/102 |
| 2002/0191848 A1 | * | 12/2002 | Boose et al. | ................ 382/181 |
| 2002/0194190 A1 | | 12/2002 | Shema et al. | |
| 2003/0025734 A1 | * | 2/2003 | Boose et al. | ................ 715/765 |

* cited by examiner

*Primary Examiner*—Marc S. Hoff
*Assistant Examiner*—Mohamed Charioui
(74) *Attorney, Agent, or Firm*—Alston & Bird LLP

(57) ABSTRACT

The method, system and computer program product for discovering a direction of flow through at least a portion of the components represented in the sheets of a drawing set includes providing an electronic representation of the sheets of the drawing set, automatically reviewing at least one sheet of the drawing set, including automatically recognizing at least one flow-related reference depicted in the sheets of the drawing set, determining a direction of flow through at least a portion of the components based upon at least one flow-related reference, and creating flow information associated with the electronic representation of the sheets of the drawing set that includes the direction of flow through at least a portion of the components. The electronic representation of the direction of flow through the portion of the components also may be viewed.

33 Claims, 11 Drawing Sheets

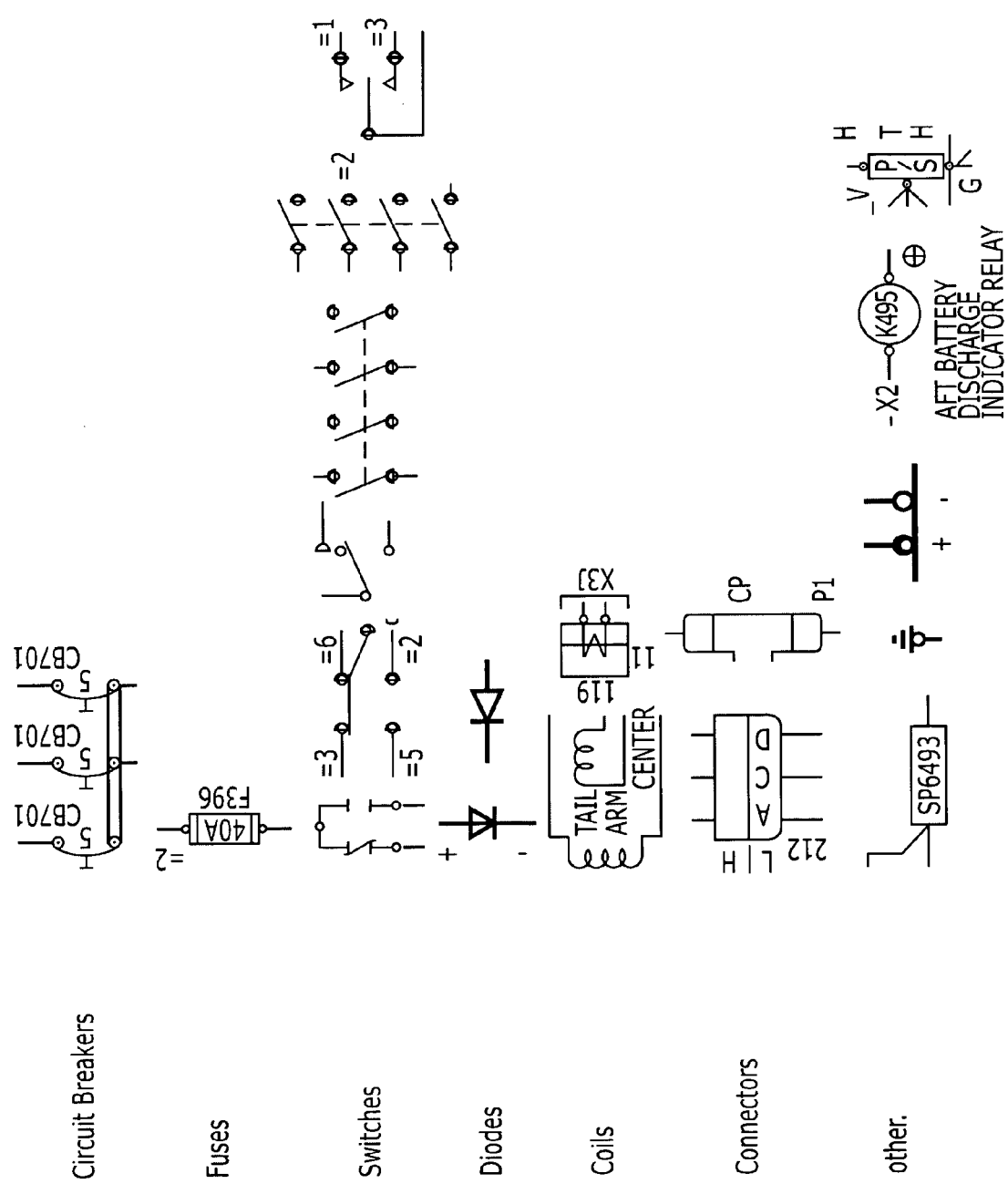

METHOD, SYSTEM AND COMPUTER PROGRAM PRODUCT FOR AUTOMATED DISCOVERY AND PRESENTATION OF THE DIRECTION OF FLOW THROUGH COMPONENTS REPRESENTED IN A DRAWING SET

FIELD OF THE INVENTION

The present invention relates to the illustration of the direction of flow through components included in an electronic representation of a drawing set and, more particularly, to a method, system and computer program product that provide automated transformation of separate graphics into an enriched electronic display permitting efficient indication of the flow through the components included in the graphics.

BACKGROUND OF THE INVENTION

Schematic diagrams include multiple components to illustrate the subject matter of the particular diagram. The subject matter of the schematic drawings may be varied and may include hydraulics, HVAC, electrical and/or any other type system. The schematic drawings described herein may be electrical wiring diagrams for illustration, but not limitation. For example, in the aircraft industry, electrical wiring diagrams are used to illustrate all of the conductive paths among the various elements of the aircraft. Thus, the term component used herein refers to any type of element included in the particular schematic diagram to illustrate the desired subject matter. In electrical wiring diagrams, for instance, components include modules, line replaceable units, plugs, switches, buses, power sources, grounds, wires, connectors, etc.

Typically, the schematic diagrams are embodied in set of multiple hard copy sheets that each include a relatively small portion of the overall schematic diagram. Thus, each sheet in a set includes references to other sheets where the portion of the schematic diagram is continued. These references are typically called "off-sheet references." The hard copy sheet sets are very time-consuming and difficult for users, such as maintenance personnel, to use, particularly when they need to reference more than one component, because they must manually locate one of the components in the sheets and then trace the connection to the other component through sometimes multiple sheets. In addition, many times a component is illustrated on multiple sheets, such as when the component is included in more than one conductive path. Thus, a user must first locate the sheet that includes the desired conductive path associated with the component.

Due to the difficulties involved in manually locating and tracing various components and conductive paths in schematic diagrams that are embodied in sets of multiple hard copy sheets, techniques have been developed for creating electronic schematic diagrams that are much easier and less time-consuming to utilize. For example, the electronic schematic diagrams contain automatic links among the various sheets, such that a user may easily see all of the conductive paths associated with a particular element and may easily navigate through the schematic. Examples of the technologies that create the electronic schematic diagrams and the associated features of the electronic diagrams are discussed in detail in U.S. Pat. No. 6,606,731, entitled "Intelligent Wiring Diagram System," U.S. patent application Ser. No. 09/971,283, entitled "Method, Computer Program Product, and System for Performing Automated Linking Between Sheets of a Drawing Set," U.S. patent application Ser. No. 09/971,155, entitled "Method, Computer Program Product, and System for Creating and Viewing an Intelligent Graphics File Including Parts Information," and U.S. patent application Ser. No. 09/971,149, entitled "Method, Computer Program Product, and System for Performing Automated Text Recognition and Text Search Within a Graphic File." The contents of each of these applications are hereby incorporated by reference in their entirety.

In many electronic schematic diagrams, it is desirable to illustrate the direction of flow through at least a portion of the components. In the example of an electronic wiring diagram, if the user is going to work on a particular component, the user may wish to know the direction of current flow though the component, such as which direction from the component the power source is located and which direction from the component the ground is located. Thus, if a user is going to work on a blown fuse or circuit breaker, the user must determine the direction from which the fuse or circuit breaker is powered. To determine the direction of flow, the user must manually trace through the elements that connect to the component at issue to determine which direction from the component the ground is located and/or which direction the power source is located. Because current flows from the source to the ground, the user knows the direction of flow through the component once the user determines which side of the component is connected to the power source and/or which side of the component is connected to the ground. Although the example of electronic wiring diagrams is used above, this situation also applies to other types of diagrams, such as hydraulics diagrams to determine the direction of fluid flow through a component, such as a valve. Thus, in any type of diagram the direction of flow may be determined by locating the flow source and/or the flow termination relative to the component(s) at issue.

Manually tracing through the elements that connect to a component typically involves accessing multiple pages of a drawing set illustrating the components of a system. The user must then study the drawings to determine how the various sheets of the drawings relate to one another. Once the user find the component at issue in the drawings, then the user must trace the elements that connect to the component through the multiple pages of the drawing set until the user finds the flow source, such as the power source, and/or flow termination, such as a ground.

Typically, the multiple pages of the drawing set are in hard copy form, such as in manuals, such that the user must physically sift through the pages of the drawings to trace the elements. Alternatively, the multiple pages of the drawing set may be electronically represented, such that the user must repeatedly "pan" and "zoom" to trace the elements through the pages. Each of these techniques is tedious, time-consuming, error-prone and can require a great deal of expertise. As such, there is a need for a technique that is capable of automatically and efficiently discovering and presenting the flow through one or more components represented in a drawing set.

BRIEF SUMMARY OF THE INVENTION

The method, system and computer program product for automated discovery and presentation of the direction of flow through components represented in a drawing set automatically transform drawings into a format that provides enriched electronic display of the drawing set, including providing indications of flow through at least a portion of the components. Thus, users of the method, system and computer program product of the present invention can automatically view the direction of flow through one or more components without having to assemble hard copies of the sheets of the drawing set and then physically trace through the elements connected to the component(s) at issue to determine the location of the flow source and/or flow termination relative to the component(s), as users of conventional drawings sets must do. In addition, users of the method, system and computer program product of the present invention do not have to repeatedly "pan" and "zoom" electronic representations of a drawing set to determine the location of the flow source and/or flow termination relative to the component(s) at issue, as users of conventional electronic drawings sets must do.

In one embodiment of the present invention, a method, system and computer program product for discovering a direction of flow through at least a portion of the components include providing an electronic representation of the sheets of the drawing set, which may be stored in a memory device. The method, system and computer program product also include automatically reviewing at least one sheet of the drawing set, including automatically recognizing at least one flow-related reference depicted in the sheets of the drawing set. This automatic review may be performed by a processing element, typically operating under the control of an executable portion of a computer program product. The method, system and computer program product of this embodiment further include determining a direction of flow through at least a portion of the plurality of components based upon at least one flow-related reference, and creating flow information associated with the electronic representation of the sheets of the drawing set that includes the direction of flow through at least a portion of the plurality of components. The determination of the direction of flow and the creation of flow information may also be performed by the processing element, again typically operating under control of a computer program product.

The flow information also may be stored. In certain embodiments, the flow information also may be displayed, such as by a display element. Further embodiments of the method, system and computer program product also may include providing a list of at least one symbol representative of flow-related references, that may be stored, such as in memory. At least one such symbol then may be identified when automatically reviewing the sheet and/or at least one flow-related reference representative of the flow through at least a portion of the components may be identified. In one embodiment, a flow source and/or a flow termination may be automatically recognized, such as by the processing element. In this embodiment, the direction of flow may be determined by determining a location of the flow source and/or the flow termination relative to the location of the component(s) at issue.

In a particular embodiment, the electronic representation that is provided may include an electronic representation of the sheets of an electronic wiring diagram. In this embodiment, at least one current flow-related reference depicted in the sheets of the electronic wiring diagram may be automatically recognized, the direction of current flow through at least a portion of the components may be determined based upon the current flow-related reference(s), and flow information including the direction of current flow through at least a portion of the components is created and associated with the electronic representation of the sheets of the electronic wiring diagram.

Embodiments of the present invention also include a method, system and computer program product for viewing an electronic representation of a direction of flow through at least a portion of the components represented in the sheets of a drawing set. The electronic representation that includes flow information associated with the components is provided. A selection of at least one of the components represented in the sheets of the drawing set is received, such as by a user interface. The flow through at least a portion of the components is automatically displayed based upon the flow information that is associated with the portion of the components, such as by the processing element. In addition, the electronic representation of the components represented in the sheets of the drawing set may be stored, such as in a memory device.

In certain embodiments of the present invention the selection of the component(s), such as by the user interface, may include receiving a unique name of the component(s), receiving a description of the component(s), and/or receiving a selection of a graphical representation of the component(s) via a selection device. In a particular embodiment, an electronic representation may include an electronic representation of electronic components represented in the sheets of an electronic wiring diagram that also includes flow information associated with the electronic components, a selection of at least one electronic component may be received, and the flow through a portion of the electronic components, including the selected component(s) may be automatically displayed based upon the flow information associated with the portion of electronic components.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 2A and 2B are is a list of patterns and symbols used to identify various types of electrical components, current flow and off-sheet references, according to one embodiment of the present invention;

Figure 9:
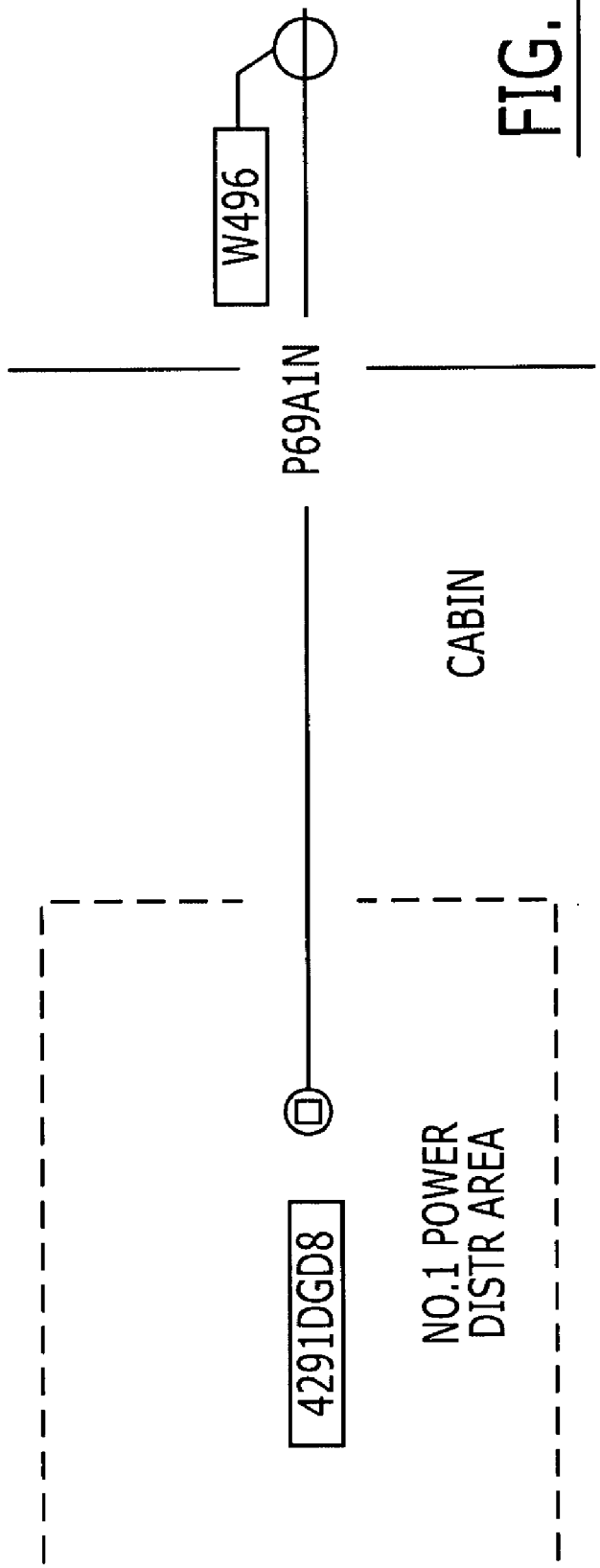
Figure 10:
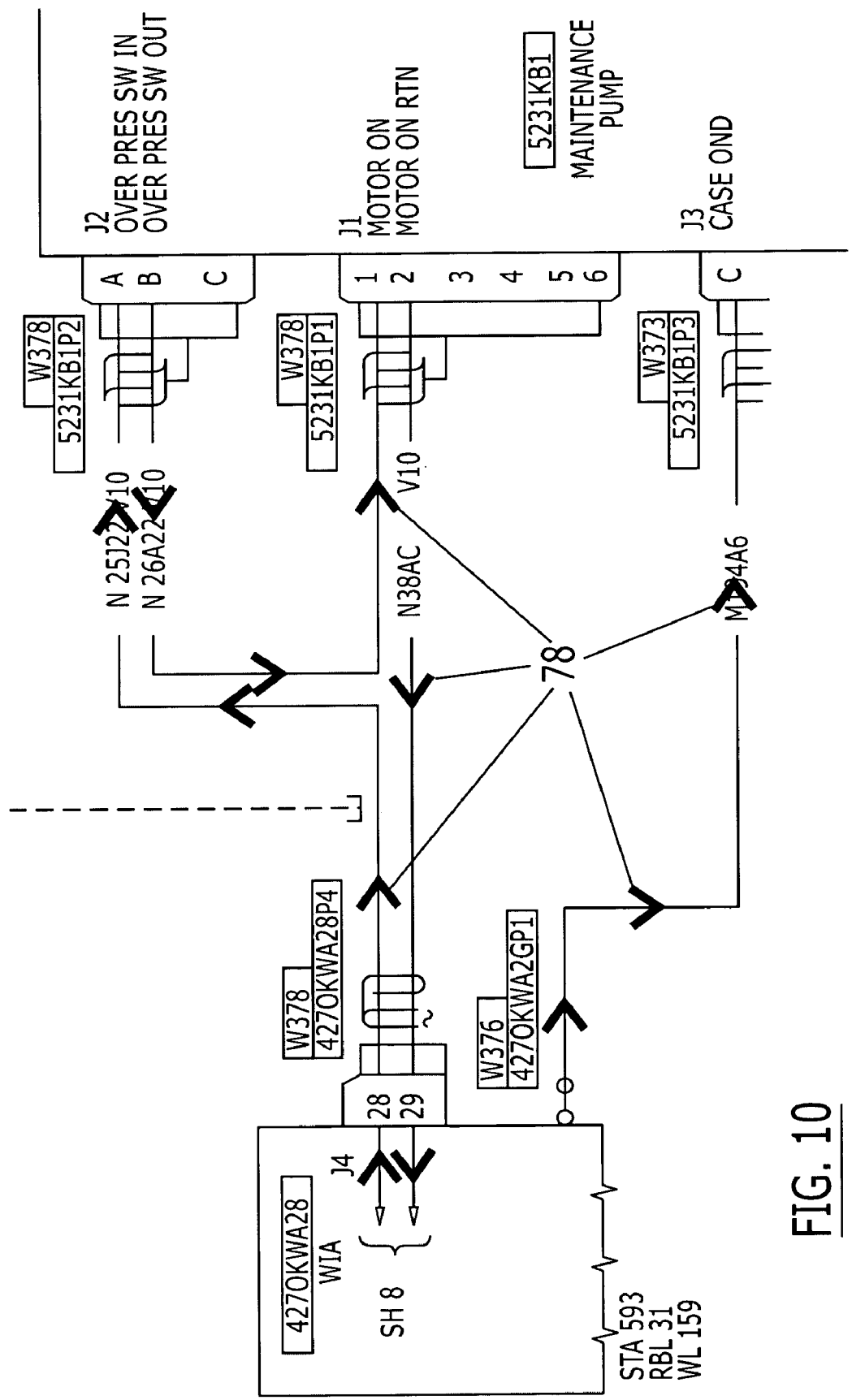

FIG. 9 illustrates another portion of an electronic diagram depicting various components of the system utilized to discover the flow through at least a portion of the components represented in the diagram, according to one embodiment of the present invention; and FIG. 10 illustrates a view of a portion of an electronic diagram depicting at least one selected component and the indication of flow through the components, according to one embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The method, system and computer program product for automated discovery and presentation of the direction of flow through components represented in a drawing set automatically transform drawings into a format that provides enriched electronic display of the drawing set, including providing indications of flow through at least a portion of the components. Thus, users of the method, system and computer program product of the present invention can automatically view the direction of flow through one or more components without having to assemble hard copies of the sheets of the drawing set and then physically trace through the elements connected to the component(s) at issue to determine the location of the flow source and/or flow termination relative to the component(s), as users of conventional drawings sets must do. In addition, users of the method, system and computer program product of the present invention do not have to repeatedly "pan" and "zoom" electronic representations of a drawing set to determine the location of the flow source and/or flow termination relative to the component(s) at issue, as users of conventional electronic drawings sets must do.

Figure 1:
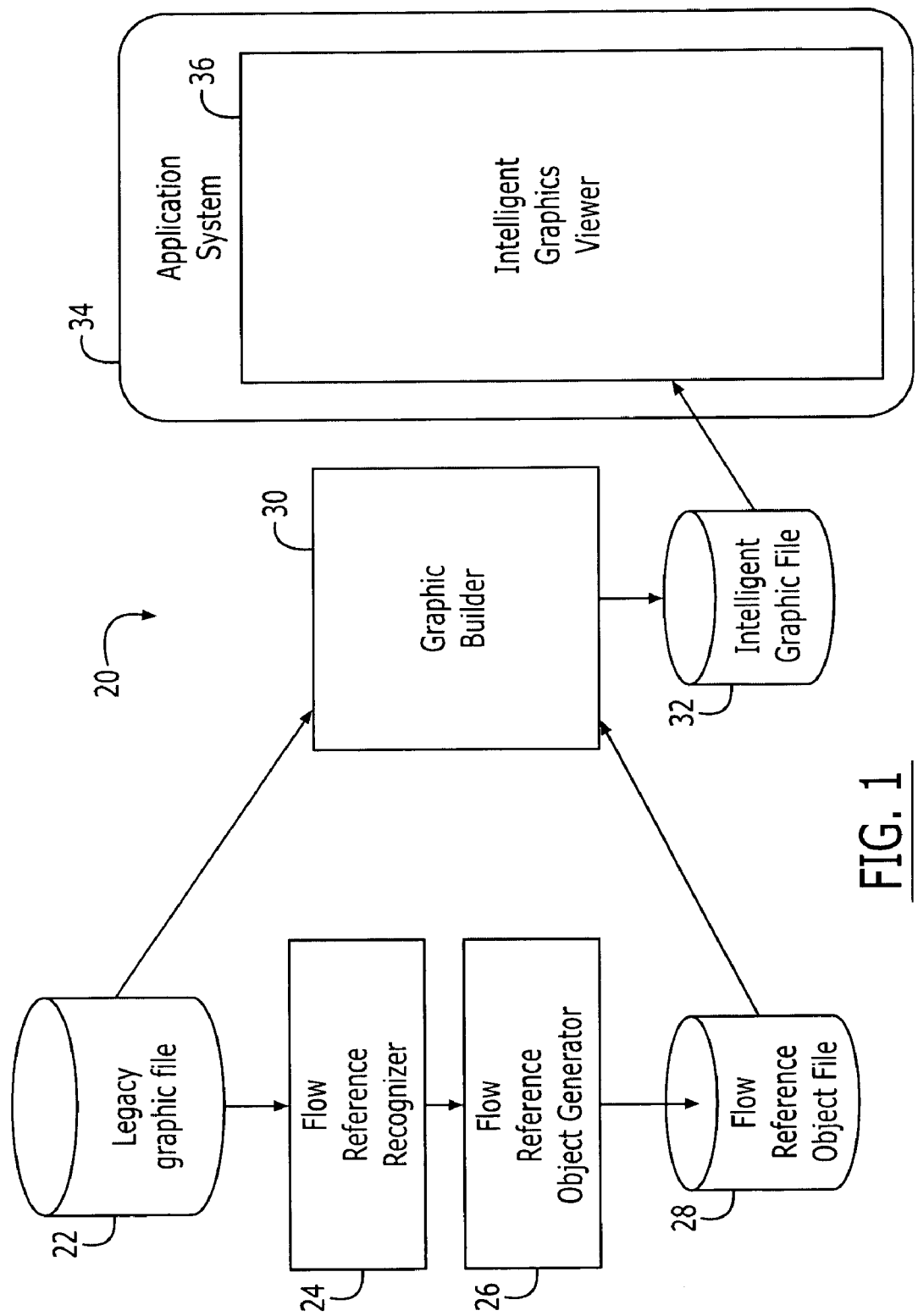
FIG. 1 is a block diagram illustrating the operations performed by the method, computer program product, and system of one embodiment of the present invention.

FIG. 1 is a block diagram illustrating the operations performed by the method, computer program product, and system 20 of one embodiment of the present invention. The legacy graphic file 22 is an electronic representation of an original drawing or set of drawings. For example, the legacy graphic file 22 may represent the complex drawings of large structures or intricate arrangements, such as electrical wiring diagrams. The drawings are commonly provided in paper/hard copy form, scanned paper images or other electronic graphic files, such as raster or vector graphic files. Before the operations depicted in FIG. 1 can commence, however, the drawings must be converted to an electronic format that allows the drawing to be extended, such as a format that may enable functionality to be embedded in the graphic. One type of extended format is a vector graphic format, for example a computer graphics metafile (CGM) format. The legacy drawings may be converted to an extended format by any available method known to those skilled in the art.

Figure 2B:
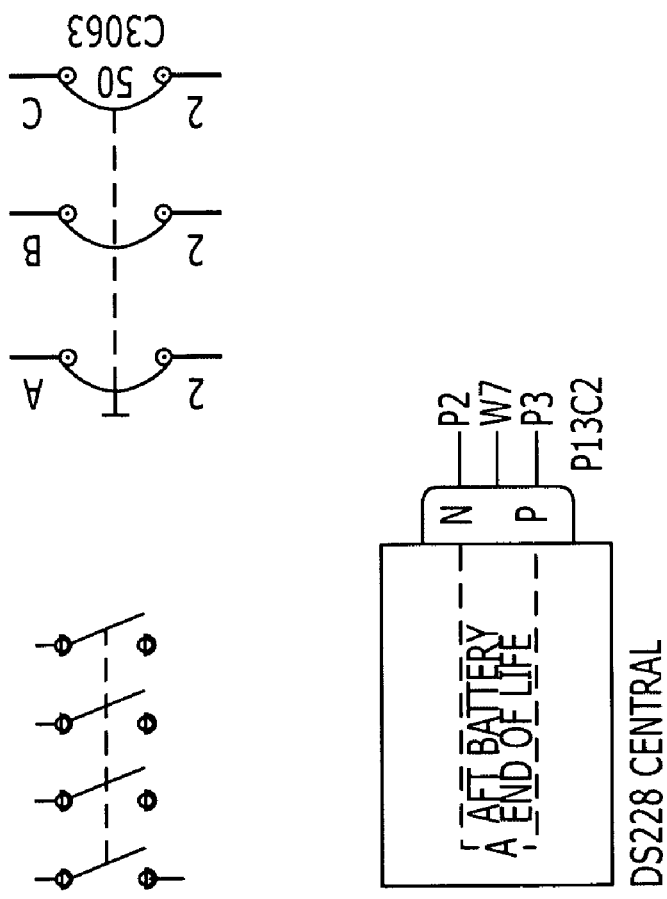

Once the drawings, such as electrical wiring diagrams, are in an interactive graphic format, depicted by the legacy graphic file 22 of FIG. 1, the legacy graphic file 22 is reviewed by the flow reference recognizer 24. In one embodiment of the present invention, the flow reference recognizer 24 reviews the legacy graphic file 22 to discover and extract flow-related references contained in the drawings. The extracted flow-related references may be explicit, such as labels or text, or implicit, such as symbols or configurations. The flow reference recognizer 24 of the present invention may discover and extract the flow-related references by matching the text, symbols and configurations of the drawing to lists containing text, symbol and configuration patterns that at least indicate the flow through the components based upon the text, symbols and configuration patterns as defined by experts and end users of the type of drawings at issue. The extracted flow-related references may also be called flow information herein. Thus, the flow reference recognizer 24 is capable of discovering the flow through components by identifying types of components, labels, symbols and any other type of indication contained in the sheets of the drawing set and by thereafter utilizing the lists to define the direction of flow. For example, in an electrical wiring diagram, the list of patterns may include predefined expressions for matching certain kinds of text, such as equipment labels, and specific graphical configurations for identifying symbols, such as batteries, power units, grounds, terminal busses, wiring assemblies, such as black boxes and line replaceable units, wires, connectors, fuses, diodes, switches, relays and circuit breakers. FIGS. 2A and 2B illustrate one example of a list of patterns and symbols used to identify various types of electrical components, current flow, such as the symbol associated with internal continuity, and off-sheet references.

The various lists of patterns may be built into the flow reference recognizer 24 or an associated memory device and used to review the drawings to identify flow-related references. Generally, the lists of patterns are predefined but typically supplemented over time, particularly as different drawings with different conventions are analyzed. The flow reference recognizer 24 then may use proximity-based algorithms, pattern-matching techniques, object recognition, logical inference and other techniques known to those skilled in the art to discover the text and symbols and to identify the direction of flow through the components represented in the drawings. Thus, even if the text and/or symbols depicted in the legacy graphic file 22 do not exactly match the text and symbol combinations in the list of patterns, the flow reference recognizer 24 may look to the general similarities, such as a common format, font or the like, and nonetheless be able to identify the components and text in the drawing. Further details regarding text recognition and text search within graphic files is provided in U.S. Pat. No. 6,606,731, entitled "Intelligent Wiring Diagram System" and U.S. patent application Ser. No. 09/971,149 entitled Method, Computer Program Product, and System for Performing Automated Text Recognition and Text Search Within Graphic Files, the contents of which are incorporated herein by reference in their entirety. The proximity-based algorithms, pattern-matching techniques, object recognition, logical inference and other techniques known to those skilled in the art also enable the flow reference recognizer 24 to identify the flow through the components represented in the drawings by associating the components and labels with a corresponding flow reference, even when the flow reference is located a relative distance from the components and/or text with which it is associated.

Figure 3:
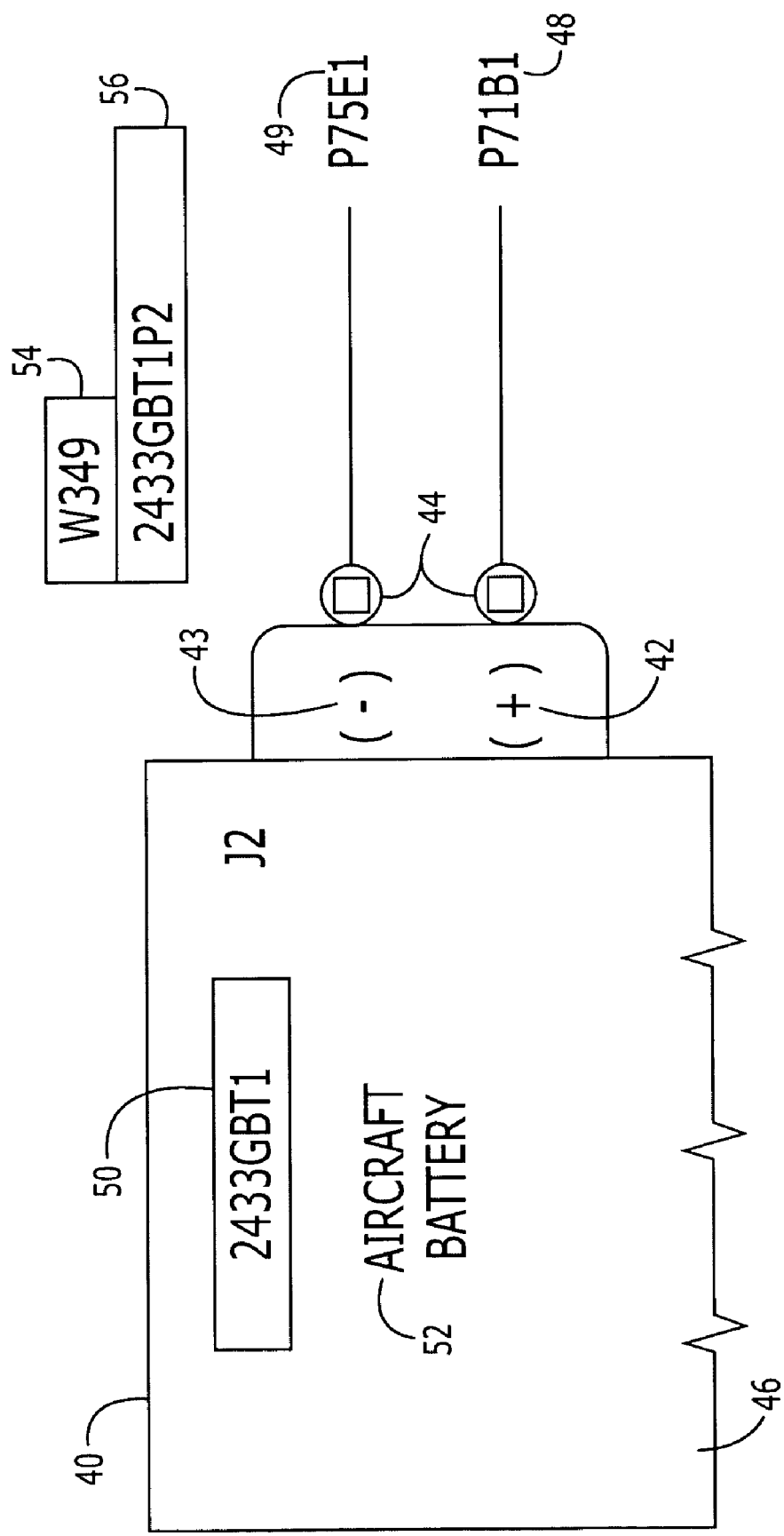
FIG. 3 illustrates a portion of an electronic diagram depicting various components of the system utilized to discover the flow through at least a portion of the components represented in the diagram, according to one embodiment of the present invention.

FIG. 3 is a magnified view of a portion of an electrical wiring diagram depicting an aircraft battery and the components connected to the battery. The flow reference recognizer 24 determines that the depicted element is a battery since the symbol combination of a box with a break line at the bottom 40 and a terminal area with positive and negative symbols 42, 43, respectively, and terminal symbols 44 is the graphical configuration for a battery 46 as defined by the list described above. In addition, the flow reference recognizer 46 identifies the text "AIRCRAFT BATTERY" 52, which is located within the graphical configuration for a battery as further indication that the component is a battery as defined by the list described above. The flow reference recognizer 24 also interprets the two lines extending outward from terminal symbols 44 to be the graphical configuration representing the wires 48, 49 connected to battery 46. Moreover, the flow reference recognizer 24 discerns the battery reference designator 50 to be the text element "2433 GBT1," the wire 49 reference designator to be the text element "P75E1," wire 48 reference designator to be the text element "P71B1," the wire harness reference designator 54 to be the text element "W349," and the connector plug reference designator 56 to be the text element "2433 GBT1P2," based upon the predefined format for these elements established by the lists.

Thus, in one embodiment of the present invention, the lists associated with the flow reference recognizer 24 for an electrical wiring diagram may include the patterns of symbols and text described above and may associate the patterns with a battery. The flow reference recognizer 24 also may infer patterns by examining the internal geometric representations of each element in the legacy graphic file 22. For example, the flow reference recognizer 24 may review the portion of the drawing sheet shown in FIG. 3, as a legacy graphic file 22, to identify the location on the drawing of the symbols and text. The flow reference recognizer 24 then may utilize the lists of patterns to match the identified symbols and text to the expert and end user defined text and symbol configurations and to identify the components of the drawing. Thus, in FIG. 3, the flow reference recognizer 24 may identify the battery 46, the wires 48, 49, the battery reference designator 50, wire 48, 49, reference designators, the wire harness reference designator 54 and the connector plug reference designator 56 by matching the symbols and text to the patterns defined in the lists built into the flow reference recognizer 24.

If the symbols and text do not exactly match the patterns in the list, the flow reference recognizer 24 may use proximity-based algorithms and/or logical inference to nevertheless identify the components of the drawing. For example, the lists associated with the flow reference recognizer 24 may not explicitly list every reference designator associated with the components. However, the lists may define the general format of the reference designators, such as a string composed of at least one letter followed by at least one number. The flow reference recognizer 24 may therefore automatically identify the wire harness reference designator 54 due to the proximity of the reference designator 54 to the wires 48, 49, i.e., within a predefined region surrounding the wires 48, 49, and further due to the format of the reference designator 54 matching the predefined format for such reference designators. While an example of the proximity-based and inferential reasoning provided by the flow reference recognizer 24 are provided above, the flow reference recognizer 24 may utilize other proximity-based and inferential reasoning techniques, if so desired. Further description of component recognition in the sheets of a drawing set is provided in U.S. Pat. No. 6,606,731, entitled "Intelligent Wiring Diagram System" and U.S. patent application Ser. No. 09/971,283, entitled "Method, Computer Program Product, and System for Performing Automated Linking Between Sheets of a Drawing Set," which are incorporated in its entirety herein by reference.

The flow reference recognizer 24 also discovers the flow through the components represented in the sheets of a drawing set, such as by tracing the flow from a flow source, such as the battery 46 in the example of an electrical wiring diagram, to a flow termination. As discussed above with respect to the electrical wiring diagram example, the flow reference recognizer 24 identifies the battery 46 having a terminal area with positive and negative symbols 42, 43, respectively, and terminal symbols 44. FIG. 3 illustrates how the flow reference recognizer 24 discovers the flow through a portion of the components connected to the battery 46. Thus, the lists described above also contain information regarding the direction of flow through the components based upon the type of components, symbols, labels and other indications contained in the particular type of drawing set that are utilized by the flow reference recognizer 24. In addition to or alternatively, the flow reference recognizer also may utilize other techniques, such as proximity-based algorithms, pattern matching, object recognition, logical inference and related algorithms to discover the flow through the components.

Figure 4:
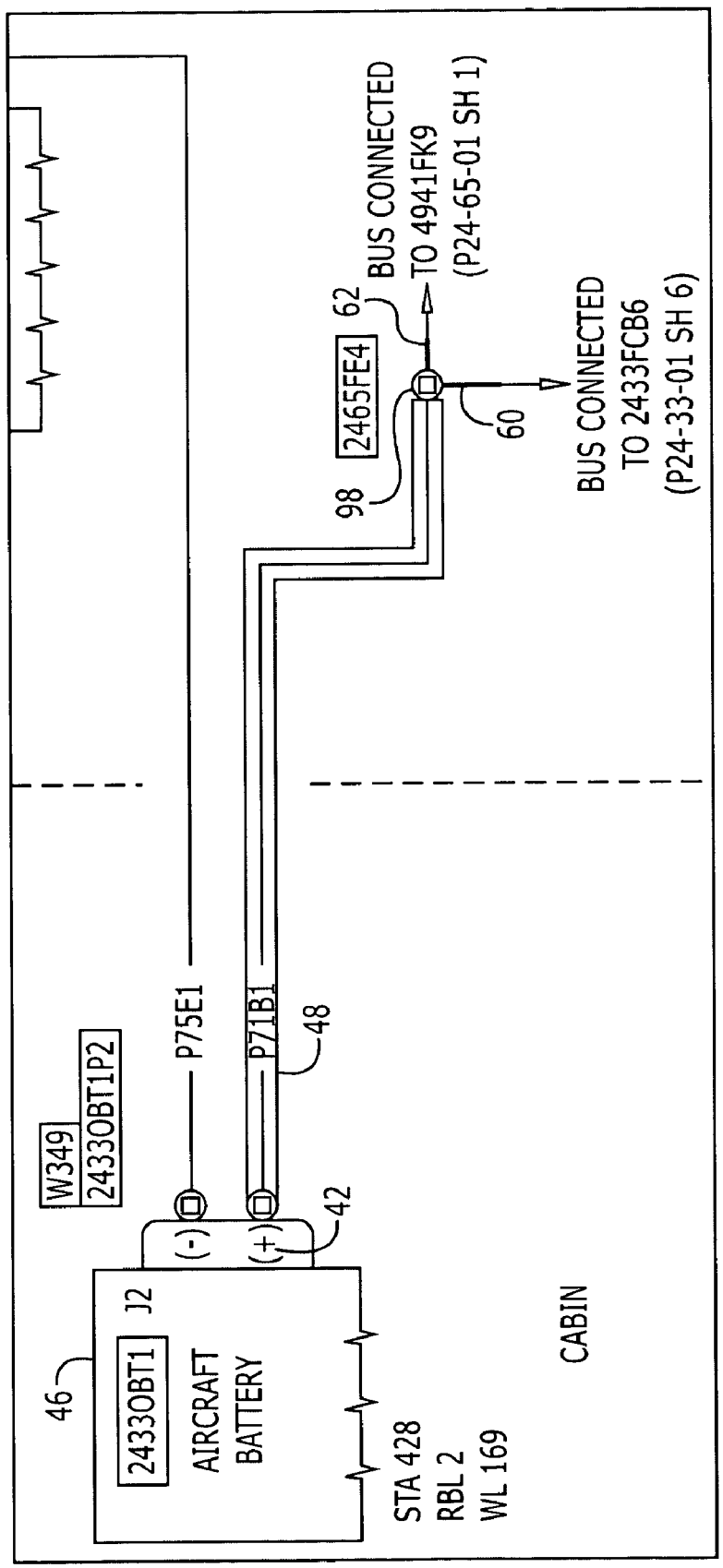
FIG. 4 illustrates another portion of an electronic diagram depicting various components of the system utilized to discover the flow through at least a portion of the components represented in the diagram, according to one embodiment of the present invention.

In the electrical wiring diagram example, the flow reference recognizer 24 identifies that the current flow leads from the positive terminal 42 of the battery 46, through wire 48 having reference designator "P71B1" and on to terminal 58 having reference designator "2465FE4." The flow reference designator 24 identifies the terminal 58 and its reference designator in the same manner as described above regarding the other components, such as the battery 46 and wires 48, 49. Continuing through FIG. 4, the flow reference recognizer 24 discovers that the flow splits into two paths 60, 62, at terminal 58. The flow reference recognizer 24 also discovers that path 60 is associated with the label "BUS CONNECTED TO 2433FCB6" and off-sheet reference "P24-33-01 SH 6" and that path 62 is associated with the label "BUS CONNECTED TO 4941FK9" and off-sheet reference "P24-65-01 SH 1." As described in detail in U.S. patent application Ser. No. 09/971,283, entitled "Method, Computer Program Product, and System for Performing Automated Linking Between Sheets of a Drawing Set," which is incorporated in its entirety herein by reference, the recognizer may identify an off-sheet reference based upon the lists or other technique, find the desired component on the off-sheet reference sheet, and place the desired component and the references to the sheets on which it is represented in a storage element, such as a database, such that automatic linking is enabled among the sheets of the drawing set.

Figure 5:
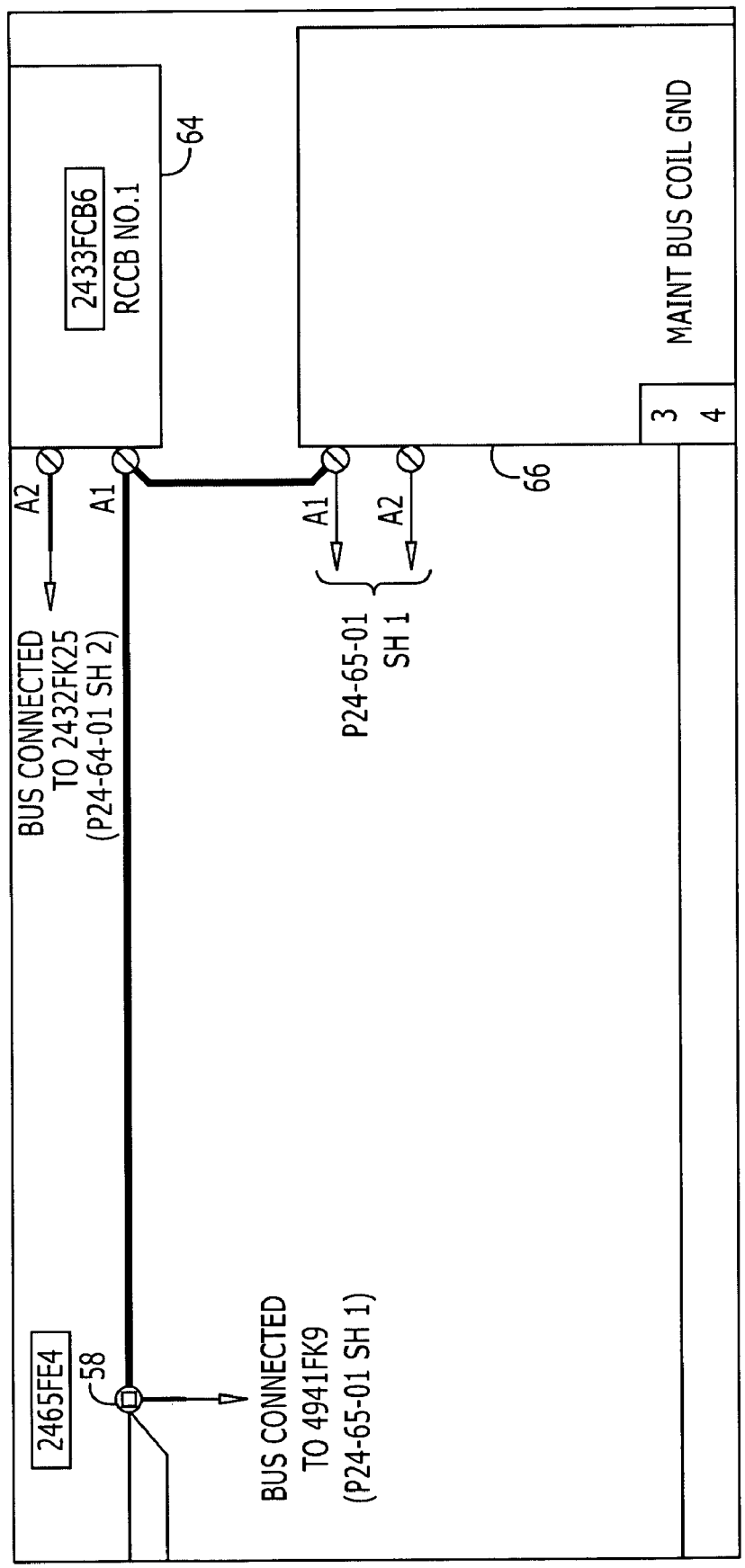
FIG. 5 illustrates another portion of an electronic diagram depicting various components of the system utilized to discover the flow through at least a portion of the components represented in the diagram, according to one embodiment of the present invention.

When a flow path splits, the flow reference recognizer 24 may follow one or more of the paths, depending upon the desires of the user. For example, if the user indicates a desire to view all of the paths through at least a portion of the components, then the flow reference recognizer 24 will trace all of the paths when a path splits. If, however, the user indicates a desire to view only a flow path through particular components, the flow reference recognizer 24 will not trace paths that do not include the particular components. For purposes of illustration, path 60 will be traced from terminal 58. Thus, FIG. 5 illustrates a portion of the drawing sheet associated with the reference "24-33-01 SH 6" that also represents terminal 58 having a reference designator "2465FE4." As shown in FIG. 5, the flow then splits into three paths at terminal 58. For purposes of illustration, the flow reference recognizer 24 follows the flow path to the right of terminal 58, which arrives at a box 64 having reference designator "2433FCB6" and label "RCCB No. 1" at terminal A1. The flow reference recognizer 24 then determines that the flow continues from terminal A1 of box 64 to terminal A1 of box 66, which is labeled "MAINT BUS COIL GND." The flow reference recognizer 24 traces the flow from terminal A1 of box 66 to the off-sheet-reference "P24-65-01 SH 1."

Figure 6:
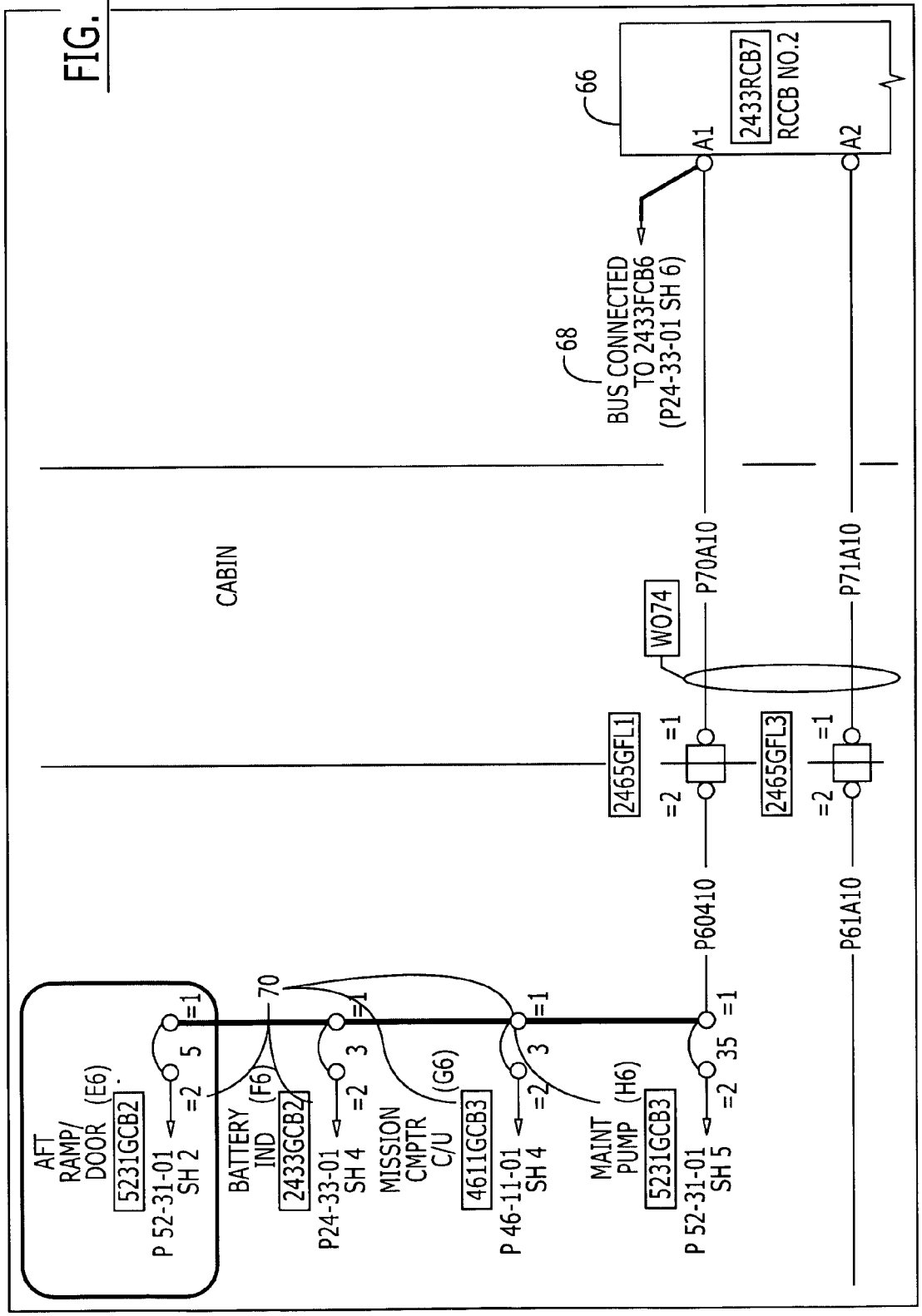
FIG. 6 illustrates another portion of an electronic diagram depicting various components of the system utilized to discover the flow through at least a portion of the components represented in the diagram, according to one embodiment of the present invention.

FIG. 6 illustrates a portion of the drawing sheet associated with the reference "24-65-01 SH 1" that also represents box 66 with terminal A1 by resolving the reference 68 that includes the text "BUS CONNECTED TO 2433FCB6" and the off-sheet reference "P24033-01 SH 6" from terminal A1. The flow reference recognizer 24 identifies box 66 as having the reference designator "2433RCB7" and labeled "RCCB NO. 2." As shown in FIG. 6, from terminal A1 of box 66, the flow reference recognizer discovers that the flow goes through the wire labeled "P70A10," past shield "W074," through the filter "2465GFL1," and through the wire labeled "P60A10." The flow reference recognizer 24 then discovers that the flow splits into four paths through the four circuit breakers 70. Again, the flow reference recognizer 24 could trace the flow through any one or more of the paths, but for purposes of illustration, the flow reference recognizer 24 will trace the flow through the top circuit breaker and finds the reference designator "5231 GCB2," label "AFT RAMP/DOOR," label "(E6)," label "=2," label "5," label "=1," and off-sheet reference "P52-31-01SH 2." The flow reference recognizer 24 would then continue to trace the flow through the components by accessing the drawing sheet associated with the reference "P52-31-01 SH 2" and locating the desired circuit breaker in the same manner as described above with regard to discovering the flow through the various other components.

Figure 7:
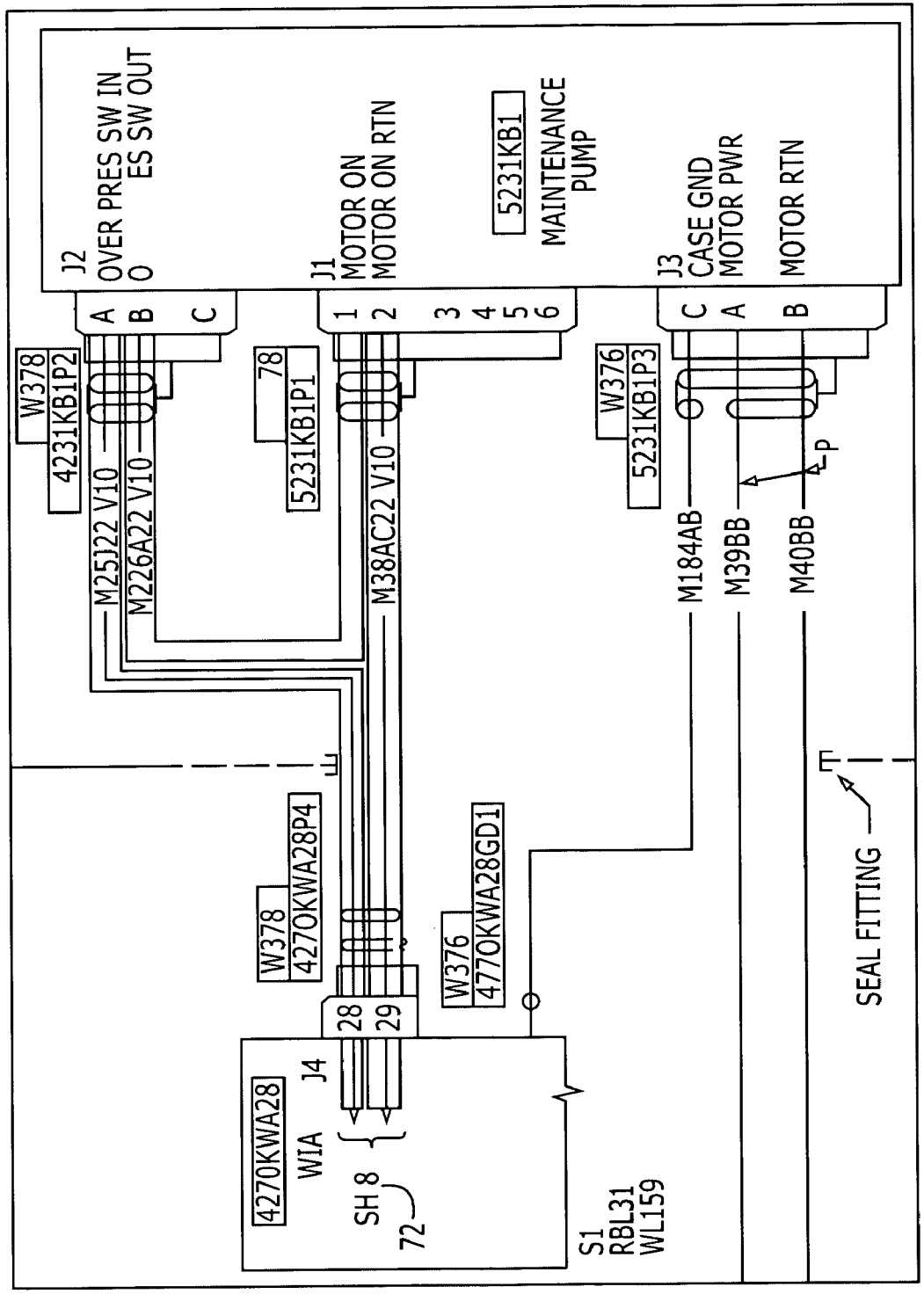
FIG. 7 illustrates another portion of an electronic diagram depicting various components of the system utilized to discover the flow through at least a portion of the components represented in the diagram, according to one embodiment of the present invention.

FIG. 7 illustrates the flow direction discovery through a portion of the components that are downstream from the components described in the above examples. Thus, the components shown in FIG. 7 are represented in a sheet of the same drawing set described in the above examples. In the example shown in FIG. 7, the flow reference recognizer 24 has accessed the sheet associated with the reference "52-31-01 SH 5" from the sheet associated with the reference "52-31-01 SH 3." As such, the flow reference recognizer 24 discovers the reference 72 with the text "SH 3" in WIA box "4270 KWA28" and pin "28" to determine the starting point on the sheet shown in FIG. 7. The flow reference recognizer then discovers the flow from pin "28" out of the box to through plug "4270 KWA28P4," harness "W378," through wire "M25J22 VIO," through plug "4231KB1P2," pin "A," and into box "5231KB1" having label "MAINTENANCE PUMP." The flow reference recognizer 24 then associates the labels in the box "5231KB 1" with the jack and pin references of the box, such as by utilizing geometric reasoning to determine:

| Jack | Pin | Label |
|---|---|---|
| J2 | A | "OVER PRES SW IN" |
| J2 | B | "OVER PRES SW OUT" |
| J1 | 1 | "MOTOR ON" |
| J1 | 2 | "MOTOR ON RTN" |
| J3 | C | "CASE GND" |
| J3 | A | "MOTOR PWR" |
| J3 | B | "MOTOR RTN" |

The flow reference recognizer 24 may utilize the labels to connect current path and infer flow that cannot be inferred graphically. For instance, the labels that include the terms "IN," "OUT," and "RTN" imply flow direction to and from the box "5231KB1" and can be utilized to connect current path through the box. Thus, the lists and/or other techniques utilized by the flow reference recognizer includes instructions regarding the direction of flow that should be implied when such a label is encountered.

In the example shown in FIG. 7, therefore, the flow reference recognizer 24 follows the flow from pin "A" with label "OVER PRES SW IN" out of the box through pin "B" with label "OVER PRES SW OUT." The flow reference recognizer 24 traces the flow through plug "4231KB1P2," harness "W378," through wire "M26A22 VIO," and back into the WIA box through plug "5231KB1P1," and pin "1" with label "MOTOR ON." The flow reference recognizer 24 then identifies that "MOTOR ON RTN" is the appropriate exit from the WIA box through pin "2," plug "5231KB1P1," through harness "W378," through wire "M38AC22 VIO" and back to the off-sheet reference "SH3." The flow reference recognizer 24 would then continue to trace the flow through the components by accessing the drawing sheet associated with the reference "SH 3," which the flow reference recognizer 24 knows is the reference "52-31-01 SH 3" from its previous analysis of the reference "SH 3," and locating the desired circuit breaker in the same manner as described above with regard to discovering the flow through the various other components.

Figure 8:
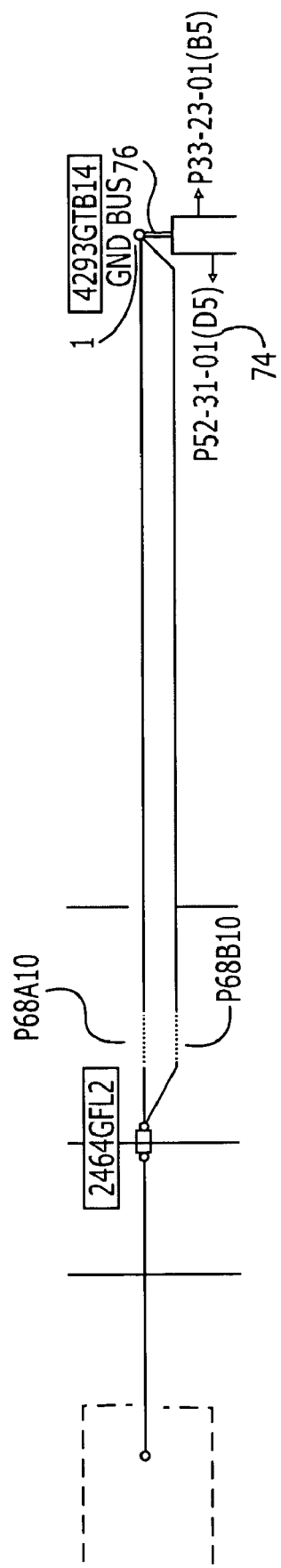
FIG. 8 illustrates another portion of an electronic diagram depicting various components of the system utilized to discover the flow through at least a portion of the components represented in the diagram, according to one embodiment of the present invention.

FIG. 8 illustrates the flow direction discovery through a portion of the components that are further downstream from the components described in the above examples. Thus, the components shown in FIG. 8 are represented in a sheet of the same drawing set described in the above examples. In the example shown in FIG. 8, the flow reference recognizer 24 has accessed the sheet associated with the reference "24-64-01" from the sheet associated with the reference "52-31-01 SH 2," where the flow reference recognizer 24 discovered a terminal strip reference "2C" with reference designator "4293GTB14" and label "GND BUS," in addition to the off-sheet reference "24-64-01" and the label "(D5)." As such, on the sheet of FIG. 8, the flow reference recognizer 24 discovers the reference 74 with the text "P52-31-01 (D5)" and uses the "2C" reference to find the terminal "C" on the terminal strip "2" to determine the starting point 76 on the sheet shown in FIG. 8. The flow reference recognizer then follows the flow up to the ground bus "4293GTB14," terminal "1" with label "GND BUS," where the flow splits into two wires. The flow reference recognizer continues to trace the flow through the two wires "P68A10" and "P68B10" to terminal "2" in filter "2464GFL2."

As shown in FIG. 9, the flow leaves the filter through terminal "1," through "W496," through wire "P69A1N," and through an area labeled "CABIN," into a box "4291DBD8" with label "NO. 1 POWER DISTR AREA," onto an unlabeled ground terminal where the flow reference recognizer 24 determines that flow terminates because a ground terminal is a flow-related reference that indicates the termination of flow, such as indicated in a list, as described above.

While the above example utilizes electrical wiring diagrams to illustrate the current flow discovery through components represented in the diagram, any other type of schematic drawing known to those skilled in the art may be utilized, such as hydraulics, HVAC, etc. In addition, although the example described above generally describes the flow reference recognizer 24 discovering the direction of flow from a flow source, such as a battery 46, to a flow termination, such as a ground, the flow reference recognizer 24 may discover the direction of flow through a portion of the components. Thus, the flow reference recognizer 24 may discover the direction of flow from the flow source and/or flow termination to any component located between the flow source and flow termination. Also, once the flow direction is discovered through any component located between the flow source and flow termination, the flow direction through any other component(s) connected to that component may also be determined without having to determine the flow direction from the flow source and/or flow termination each time.

After the flow reference recognizer 24 discovers the flow through at least one component, the reference object generator 26 may create a reference object file 28. The reference object file 28 contains the reference designators, off-sheet references, labels, elements, and components identified by the flow reference recognizer 24 and the features added by the reference object generator 26, as described below. The reference object generator 26 may create one reference object file 28 for each original drawing sheet, although the reference object file 28 may dissect or combine the original drawing sheets in other ways, if desired. The format of the reference object file 28 may be any computer readable format, for example a markup format, such as extensible markup language (XML) format.

In one embodiment of the present invention, the reference object generator 26 reviews the information supplied by the flow reference recognizer 24 and identifies additional features of the elements. For example, the reference object generator 26 may identify the "state" of the element, if applicable. For example, for a circuit breaker, the reference object generator 26 may identify the circuit breaker and further identify the "state" of the circuit breaker. The reference object generator 26 may identify the state of the circuit breaker by the location of the symbols that comprise the graphical representation of the circuit breaker. For example, if the circuit breaker is closed, the arc may connect the two circles in the circuit breaker graphical representation and, if the circuit breaker is open, the arc may be separated by a distance from the two circles. The reference object generator 26 then may record the initial state of the circuit breaker as "closed" or "open" to include in the reference object file 28 with the associated circuit breaker reference designator. The element state and reference designator recorded in the reference object file 28 provide the information that may be used later in the operations of one embodiment of the present invention to change the component state, navigate among drawings depicting the component, and ensure the component state is the same in all of the drawings. The reference object generator 26 also may add instructions into the reference object file 28 regarding changing the graphical representation of a circuit element, such as the circuit breaker, when the state of the circuit element is changed from its initial state and afterward. Changing the graphical representation of the circuit breaker from its initial state, for instance, may include changing the color and location of the arc part of the symbol. The instructions added to the reference object file 28 by the reference object generator 26 also may include text indicating the state of the circuit breaker that may appear near the circuit breaker when the circuit breaker is selected. Further explanation of examples of the identification and manipulation of the state of various components is included in U.S. Pat. No. 6,606,731, entitled "Intelligent Wiring Diagram System" and U.S. patent application Ser. No. 09/971,283, entitled "Method, Computer Program Product, and System for Performing Automated Linking Between Sheets of a Drawing Set," which are incorporated in its entirety herein by reference.

In addition, when the reference object generator 26 reviews the information supplied by the flow reference recognizer 24 it identifies the flow direction through a component, such as a wire. For example, the reference object generator 26 may identify the equipment from which the flow comes and the equipment to which the flow goes, if applicable and record the flow equipment in the appropriate reference object file 28 to provide the information that may be used later in the operations of the present invention to illustrate the direction of flow through the desired component(s). As illustrated below in the example of the object for a wire, the object includes the equipment connected to the wire from which the flow comes and the equipment to which the flow goes.

Furthermore, the reference object generator 26 identifies the flow source and flow termination components in the appropriate objects. For instance, as illustrated below, an object file associated with a battery would identify the battery as the flow source.

Below is an example of a portion of an XML reference object file for the battery 46 shown in FIG. 3:

```
<object id="BAT909" role="ECOMP" name="BATTERY" refdes=
"2433GBT1" label_1="AIRCRAFT BATTERY" hslistid="HS909"
termpos="TERM282" termneg="TERM,283" magtext="BATTERY"
flowtype="SOURCE">
</object>
``` wherein "object id="BAT909"" identifies an object for the battery that contains its role as an electrical component "role="ECOMP,"" its name "name="BATTERY,"" its reference designator "refdes="2433GBT1"" and its label "label_1="AIRCRAFT BATTERY."" Although only one label is shown in this example, multiple labels may be included in other objects. The object also includes a hotspot list pointer (explained further below) "hslistid="HS909,"" references to separate objects containing the positive and negative battery terminals "termpos="TERM 282"" and termneg="TERM283,"" magnified text that appears when a selection device hovers over the object (explained further below) "magtext="BATTERY"" and a schematic flow type "flowtype="SOURCE."

Below is an example of a portion of an XML reference object file for the positive terminal of battery 46 shown in FIG. 3:

```
<object id="TERM282" role="ECOMP" name=
"BAT_TERMINAL_POS" hslistid ="HS282"
states="S282-CLOSED" init_state="S282-CLOSED">
</object>
``` wherein "object id="TERM282"" identifies an object for the positive terminal of the battery that contains its role as an electrical component "role="ECOMP,"" its name "name="BAT_TERMINAL_POS "" its hotspot list pointer (explained further below) "hslistid="HS282,"" its state "states="S282-CLOSED,"" and its itinital state "init_state="S282-CLOSED.""

Below is an example of a portion of an XML reference object file for the object state of the positive terminal of battery 46 shown in FIG. 3:

```
<object id="S282-CLOSED" role="EC_STATE" connect="N41"
    magtext="BATTERY%+">
    </object>
``` wherein "object id="S282-CLOSED"" identifies an object for the state of the positive terminal of the battery that contains its role as an electrical component state "role="EC_STATE,"" a list of the wire networks (i.e., wirenet) to which the terminal is connected when it is in the referenced state "connect="N41,"" and the magnified text that appears when a selection device hovers over the object (explained further below) "magtext="BATTERY % +. ""

Below is an example of a portion of an XML reference object file for the wirenet connected to the positive terminal of battery 46 and one of the wires in the wirenet shown in FIG. 3:

```
<object id="N41" role="WIRENET">
    <object id="WIRE41" hslistid="HS528" role="WIRE" wirelabel=
        "P71B1"
magtext="P71B1" bundle="W349" fromequip="2433GBT1P2"
fromterm="TERM282"
toequip="2465FE4" toterm="TERM384" viawire="P71B1"
viaharness="W349"></object>
    <object . . . </object>
:
</object>
``` wherein "object id="N41"" identifies an object for the wirenet connected to the battery that contains its role as a wirenet "role="WIRENET."" Each wire has an object file, such as that illustrated above wherein "object id="WIRE41"" identifies an object for a wire in the wirenet that contains a hotspot list pointer (explained further below) "hslistid="HS528,"" its role as a wire "role="WIRE,"" its label "wirelabel="P71B1,"" the magnified text that appears when a selection device hovers over the object (explained further below) "magtext="P71B1,"" and its wire bundle "bundle="W329."" The wire reference object file also contains the equipment and terminal from which the flow comes "fromequip="2433GBT1P2"" and "fromterm= "TERM282,"" the equipment and terminal to which the flow goes "toequip="2465FE4"" and "toterm="TERM384,"" and the flow conduit, such as the wire and wire harness "viawire="P71B1"" and "viaharness="W349.""

A further embodiment of the method, computer program product, and system 20 of the present invention provides that the reference object generator 26 supplies instructions to include in the reference object file 28 that create "hotspots" for particular elements or groups of components. A hotspot defines an area of the diagram or an element in the diagram that is visually emphasized when a selection device, such as a mouse, brushes over the element or area. For example, to create a hotspot for the battery 46 in FIG. 3, the reference object generator 26 may identify a rectangular highlighted region over the battery 46 and the text to display near the battery 46. The reference object generator 26 then includes the hotspot instructions in the reference object file 28 to define the bounds of the hotspot and the manner in which the hotspot is to be depicted, such as by being highlighted or the like. Recording the hotspot instructions in the reference object file 28 provides the information that may be used later in the operations of one embodiment of the present invention to display a highlighted region around the battery along with text near the battery each time a selection device, such as a mouse, brushes over battery 46. Thus the hotspot list pointer instructions and the magnified text instructions illustrated in the reference object files described above contain the hotspot instructions and text instructions that define the display each time a selection device brushes over the associated component. Further explanation of at least some of the foregoing features of the method, computer program product, and system 20 of the present invention described above may be found in U.S. Pat. No. 6,606,731, entitled "Intelligent Wiring Diagram System," the contents of which are incorporated herein by reference in their entirety.

One advantageous embodiment of the method, computer program product, and system 20 of the present invention provides that the graphic builder 30 depicted in FIG. 1 merge the information from the reference object file 28 and the legacy graphic file 22 to form an intelligent graphic file 32. The format of the intelligent graphic file 32 may be an electronic format that allows the drawing to be interactive, such that data from the reference object file 28 may be embedded in the legacy graphic file 22, for example a computer graphics metafile (CGM) format. To embed data from the reference object file 28, including the flow information, in the legacy graphic file 22, the intelligent graphic file 32 may contain application program structures to "hide" the data from the reference object file 28 in the graphic file. Typically, hundreds of application program structures may exist in an intelligent graphic file 32 for a single drawing, one of which is associated with each embedded data element from the reference object file 28. For a particularly complex drawing, more than one thousand application program structures may exist in an intelligent graphic file 32.

The application system 34 also may contain databases with all of the information about the drawing set, including the flow information discovered by the flow reference recognizer 24, as described above. In addition, the application system 34 also may provide the ability to display the electronic representation of the sheets of the drawing set and the flow information discovered by the flow reference recognizer 24, such as by accessing the database(s) that store the flow information and obtaining the flow information associated with the component(s) at issue. In other embodiments of the present invention, the desired flow information may not be stored in the database(s) and, therefore, the flow reference recognizer 24 may discover the flow information at the time a request is made and directly presented to the user. To display the electronic representation of the sheets of the drawing set and the flow information discovered by the flow reference recognizer 24, the application system 34 may include an intelligent graphics viewer 36. The intelligent graphics viewer 36 is any type of display element known to those skilled in the art that permits a user to view one or more desired portions of an electronic diagram and any other information associated with the electronic diagram. Thus, the intelligent graphics viewer 36 provides an interface between the system 20 and a user. As such, the intelligent graphics viewer 36 also may include a user interface, such as a browser, that permits the user to submit request and interact with the display of the electronic diagram.

A user interface, therefore, allows a user to make a selection of at least one component represented in the electronic diagram presented to the user through which flow is to be determined. To make a selection of one or more component, the user may submit a unique name for the component(s), which is received by the system 20 and provides the instructions regarding the components through which the flow information is desired. In another embodiment, a user may submit a description of the component(s) that the system 20 may utilize to identify the desired component(s) through which the flow information is desired. In further embodiments, a user may access an electronic diagram that includes graphical representations of the desired component(s) and select the desired component(s) with a selection device, such as a mouse. Any other technique known to those skilled in the art for selecting the desired component(s) may also be utilized in the method, system 20 and computer program product of the present invention.

Once the user makes a selection, the method, system 20 and computer program product of the present invention is capable of discovering the flow information associated with the selected component(s) in the manner described hereinabove, and then automatically displaying the flow through the component(s) based upon the flow information. For example, as FIG. 10 illustrates, a portion of the components in an electronic diagram may be presented to the user along with flow indicators 78 to illustrate the direction of the flow through the components. In this example, the user may have selected any one or more of the components shown in FIG. 10 and the method, system 20 and computer program product of the present invention presents the view shown in FIG. 10 along with the flow indictors 78 to the user.

In other embodiments of the method, system 20 and computer program product, the application system 34 may include databases containing other information regarding the components depicted in the diagram such that a user viewing the graphical representation of the diagram including the flow through at least a portion of the components may also access textual information regarding the components depicted in the diagram. Further details regarding accessing textual information regarding the components depicted in the diagram is provided in U.S. patent application Ser. No. 09/971,149, entitled, "Method, Computer Program Product, and System for Performing Automated Text Recognition and Text Search Within a Graphic File," the contents of which is hereby incorporated by reference in its entirety. In addition, the application system 34 may provide the ability to display intelligent graphic files depicting the different configurations of the components contained in the intelligent graphic file, such as intelligent graphic files of parts catalogs or maintenance manuals. Further details regarding including associated parts information in the display is provided in U.S. patent application Ser. No. 09/971, 155 entitled "Method, Computer Program Product, and System for Creating and Viewing an Intelligent Graphics File Including Parts Information," the contents of which are incorporated herein by reference in their entirety.

The system 20 of the present invention and, in particular, the flow reference recognizer 24, the flow reference object generator 26, the graphic builder 30, the application system 34, and the intelligent graphics viewer 36, are typically embodied by a processing element and an associated memory device, both of which are commonly comprised by a computer or the like. As such, the system of the present invention generally operates under control of a computer program product to provide the functionality described hereinabove in conjunction with the various components of the system, according to another aspect of the present invention. The computer program product for discovering and/or viewing flow through components of an electronic diagram includes a computer-readable storage medium, such as the non-volatile storage medium, and computer-readable program code portions, such as a series of computer instructions, embodied in the computer-readable storage medium.

In this regard, FIG. 1 is a flow diagram of methods, systems and program products according to the invention. It will be understood that each block or step of the flow diagram, and combinations of blocks in the flow diagram, can be implemented by computer program instructions. These computer program instructions may be loaded onto a computer or other programmable apparatus to produce a machine, such that the instructions which execute on the computer or other programmable apparatus create means for implementing the functions specified in the flow diagram block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flow diagram block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow diagram block(s) or step(s).

Accordingly, blocks or steps of the flow diagram support combinations of means for performing the specified functions, combinations of steps for performing the specified functions and program instruction means for performing the specified functions. It will also be understood that each block or step of the flow diagram, and combinations of blocks or steps in the flow diagram, can be implemented by special purpose hardware-based computer systems which perform the specified functions or steps, or combinations of special purpose hardware and computer instructions.

Thus, the method, system 20 and computer program product for automated discovery and presentation of the direction of flow through components represented in a drawing set provide automatically transform drawings into a format that provides enriched electronic display of the drawing set, including providing indications of flow through at least a portion of the components. Thus, users of the method, system and computer program product of the present invention can automatically view the direction of flow through one or more components without having to assemble hard copies of the sheets of the drawing set and then physically trace through the elements connected to the component(s) at issue to determine the location of the flow source and/or flow termination relative to the component(s), as users of conventional drawings sets must do. In addition, users of the method, system and computer program product of the present invention do not have to repeatedly "pan" and "zoom" electronic representations of a drawing set to determine the location of the flow source and/or flow termination relative to the component(s) at issue, as users of conventional electronic drawings sets must do.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodi- That which is claimed:

1. A method of discovering a direction of flow through at least a portion of a plurality of components represented in a plurality of sheets of a drawing set comprising:
   providing an electronic representation of the plurality of sheets of the drawing set;
   automatically reviewing at least one sheet of the drawing set, wherein automatically reviewing at least one sheet comprises automatically recognizing at least one flow-related reference depicted in the plurality of sheets of the drawing set;
   determining a direction of flow through at least a portion of the plurality of components based upon the at least one flow-related reference; and
   creating flow information comprising the direction of flow through at least a portion of the plurality of components, wherein the flow information is associated with the electronic representation of the plurality of sheets of the drawing set.

2. The method of claim 1, further comprising storing the flow information.

3. The method of claim 1, further comprising displaying the flow information associated with the electronic representation of the plurality of sheets of the drawing set.

4. The method of claim 1, further comprising providing a list of at least one symbol representative of flow-related references and wherein automatically reviewing the at least one sheet further comprises automatically recognizing at least one flow-related reference by identifying at least one symbol representative of the at least one flow-related reference.

5. The method of claim 1, further comprising providing a list of at least one symbol representative of flow-related references and wherein determining a direction of flow through at least a portion of the plurality of components comprises identifying at least one flow-related reference representative of the direction of flow through at least a portion of the plurality of components.

6. The method of claim 1, wherein automatically recognizing at least one flow-related reference depicted in the plurality of sheets of the drawing set comprises automatically recognizing at least one of a flow source and a flow termination, and wherein determining a direction of flow through at least a portion of the plurality of components comprises determining a location of at least one of the flow source and flow termination relative to the location of the at least a portion of the plurality of components.

7. The method of claim 1,
   wherein providing an electronic representation of the plurality of sheets of the drawing set comprises providing an electronic representation of the plurality of sheets of an electronic wiring diagram;
   wherein automatically recognizing at least one flow-related reference depicted in the plurality of sheets of the drawing set comprises automatically recognizing at least one current flow-related reference depicted in the plurality of sheets of the drawing set;
   wherein determining a direction of flow through at least a portion of the plurality of components based upon the at least one flow-related reference comprises determining a direction of current flow through at least a portion of the plurality of components based upon the at least one current flow-related reference; and
   wherein creating flow information comprising the direction of flow through at least a portion of the plurality of components comprises creating flow information comprising the direction of current flow through at least a portion of the plurality of components, wherein the current flow information is associated with the electronic representation of the plurality of sheets of the electronic wiring diagram.

8. A system for discovering a direction of flow through at least a portion of a plurality of components represented in a plurality of sheets of a drawing set comprising:
   a memory device for storing an electronic representation of the plurality of sheets of the drawing set; and
   a processing element capable of automatically reviewing at least one sheet of the drawing set, said processing element also capable of automatically recognizing at least one flow-related reference depicted in the plurality of sheets of the drawing set, said processing element also capable of determining a direction of flow through at least a portion of the plurality of components based upon the at least one flow-related reference, and said processing element further capable of creating flow information comprising the direction of flow through at least a portion of the plurality of components that is associated with the electronic representation of the plurality of sheets of the drawing set.

9. The system of claim 8, further comprising a display element capable of displaying the flow information associated with the electronic representation of the plurality of sheets of the drawing set.

10. The system of claim 8, wherein said memory device also stores a list of at least one symbol representative of flow-related references and wherein said processing element is also capable of automatically recognizing at least one flow-related reference by identifying at least one symbol representative of the at least one flow-related reference.

11. The system of claim 8, wherein said memory device also stores a list of at least one symbol representative of flow-related references and wherein said processing element is also capable of identifying at least one flow-related reference representative of the direction of flow through at least a portion of the plurality of components.

12. The system of claim 8, wherein said processing element is also capable of automatically recognizing at least one of a flow source and a flow termination, and wherein said processing element is further capable of determining a location of at least one of the flow source and flow termination relative to the location of the at least a portion of the plurality of components.

13. The system of claim 8 wherein said processing element is capable providing an electronic representation of the plurality of sheets of an electronic wiring diagram, wherein said processing element is capable of automatically recognizing at least one current flow-related reference depicted in the plurality of sheets of the drawing set, wherein said processing element is capable of determining a direction of current flow through at least a portion of the plurality of components based upon the at least one current flow-related reference, and wherein said processing element is capable of creating flow information comprising the direction of current flow through at least a portion of the plurality of components, wherein the current flow information is associated with the electronic representation of the plurality of sheets of the electronic wiring diagram.

14. A computer-readable storage medium having computer-readable program instructions stored therein for discovering a direction of flow through at least a portion of a plurality of components represented in a plurality of sheets of a drawing set, the computer-readable program instruction comprising:
- a first executable portion capable of providing an electronic representation of the plurality of sheets of the drawing set;
- a second executable portion capable of automatically reviewing at least one sheet of the drawing set, wherein said second executable portion is also capable of automatically recognizing at least one flow-related reference depicted in the plurality of sheets of the drawing set;
- a third executable portion capable of determining a direction of flow through at least a portion of the plurality of components based upon the at least one flow-related reference; and
- a fourth executable portion capable of creating flow information comprising the direction of flow through at least a portion of the plurality of components, wherein the flow information is associated with the electronic representation of the plurality of sheets of the drawing set.

15. The computer-readable storage medium of claim 14, further comprising a fifth executable portion capable of storing the flow information.

16. The computer-readable storage medium of claim 14, further comprising a fifth executable portion capable of displaying the flow information associated with the electronic representation of the plurality of sheets of the drawing set.

17. The computer-readable storage medium of claim 14, further comprising a fifth executable portion capable of providing a list of at least one symbol representative of flow-related references and wherein said second executable portion is further capable of automatically recognizing at least one flow-related reference by identifying at least one symbol representative of the at least one flow-related reference.

18. The computer-readable storage medium of claim 14, further comprising a fifth executable portion capable of providing a list of at least one symbol representative of flow-related references and wherein said third executable portion is also capable of identifying at least one flow-related reference representative of the direction of flow through at least a portion of the plurality of components.

19. The computer-readable storage medium of claim 14, wherein said second executable portion is also capable of automatically recognizing at least one of a flow source and a flow termination, and wherein said third executable portion is also capable of determining a location of at least one of the flow source and flow termination relative to the location of the at least a portion of the plurality of components.

20. The computer-readable storage medium of claim 14 wherein said first executable portion is further capable of providing an electronic representation of the plurality of sheets of an electronic wiring diagram, wherein said second executable portion is further capable of automatically recognizing at least one current flow-related reference depicted in the plurality of sheets of the drawing set, wherein said third executable portion is further capable of determining a direction of current flow through at least a portion of the plurality of components based upon the at least one current flow-related reference, and wherein said fourth executable portion is further capable of creating flow information comprising the direction of current flow through at least a portion of the plurality of components, wherein the current flow information is associated with the electronic representation of the plurality of sheets of the electronic wiring diagram.

21. A method of viewing an electronic representation of a direction of flow through at least a portion of a plurality of components represented in a plurality of sheets of a drawing set comprising:
- providing the electronic representation of the plurality of components represented in the plurality of sheets of the drawing set, wherein providing the electronic representation comprises providing flow information associated with the plurality of components;
- receiving a selection of at least one of the plurality of components represented in the plurality of sheets of the drawing set; and
- automatically displaying the flow through at least a portion of the plurality of components including the selected at least one component based upon the flow information associated with the portion of the plurality of components.

22. The method of claim 21, wherein receiving a selection of at least one of the plurality of components comprises receiving a unique name of at least one component.

23. The method of claim 21, wherein receiving a selection of at least one of the plurality of components comprises receiving a description of at least one component.

24. The method of claim 21, wherein receiving a selection of at least one of the plurality of components comprises receiving a selection of a graphical representation of at least one component via a selection device.

25. The method of claim 21,
- wherein providing the electronic representation of the plurality of components represented in the plurality of sheets of the drawing set comprises providing an electronic representation of the plurality of electronic components represented in a plurality of sheets of an electronic wiring diagram, wherein providing the electronic representation comprises providing flow information associated with the plurality of electronic components;
- wherein receiving a selection of at least one of the plurality of components represented in the plurality of sheets of the drawing set comprises receiving a selection of at least one electronic component represented in the plurality of sheets of the drawing set; and
- wherein automatically displaying the flow through at least a portion of the plurality of components comprises automatically displaying the flow through at least a portion of the plurality of electronic components including the selected at least one electronic component based upon the flow information associated with the portion of the plurality of electronic components.

26. A system of viewing an electronic representation of a direction of flow through at least a portion of a plurality of components represented in a plurality of sheets of a drawing set comprising:
- a memory device for storing the electronic representation of the plurality of components represented in the plurality of sheets of the drawing set, said memory device also for storing flow information associated with the plurality of components;
- a user interface capable of receiving a selection of at least one of the plurality of components represented in the plurality of sheets of the drawing set; and a processing element responsive to the selection of at least one of the plurality of components, said processing element capable of automatically displaying the flow through at least a portion of the plurality of components including the selected at least one component based upon the flow information associated with the portion of the plurality of components.

27. The system of claim 26, wherein said user interface is capable of receiving a unique name of at least one component.

28. The system of claim 26, wherein said user interface is capable of receiving a description of at least one component.

29. The system of claim 26, wherein said user interface is capable of receiving a selection of a graphical representation of at least one component via a selection device.

30. A computer-readable storage medium having computer-readable program instructions stored therein for viewing an electronic representation of a direction of flow through at least a portion of a plurality of components represented in a plurality of sheets of a drawing set, the computer-readable program instructions comprising:

a first executable portion capable of providing the electronic representation of the plurality of components represented in the plurality of sheets of the drawing set, said first executable portion also capable of providing flow information associated with the plurality of components;

a second executable portion capable of receiving a selection of at least one of the plurality of components represented in the plurality of sheets of the drawing set; and a third executable portion capable of automatically displaying the flow through at least a portion of the plurality of components including the selected at least one component based upon the flow information associated with the portion of the plurality of components.

31. The computer-readable storage medium of claim 30, wherein said second executable portion is also capable of receiving a unique name of at least one component.

32. The computer-readable storage medium of claim 30, wherein said second executable portion is also capable of receiving a description of at least one component.

33. The computer-readable storage medium of claim 30, wherein said second executable portion is also capable of receiving a selection of a graphical representation of at least one component via a selection device.

* * * * *